United States Patent [19]

Clark et al.

[11] 4,081,622

[45] Mar. 28, 1978

[54] ELECTRONIC CIRCUIT FOR A SPEAKERPHONE

[75] Inventors: Jeremy Clark, Montreal; Robert Allen, Pointe Claire, both of Canada

[73] Assignee: Technex International Ltd., St. Laurent, Canada

[21] Appl. No.: 737,015

[22] Filed: Oct. 29, 1976

[51] Int. Cl.[2] .............................................. H04M 1/60

[52] U.S. Cl. ............................... 179/81 B; 179/81 A; 179/1 HF

[58] Field of Search .............. 179/81 B, 81 A, 170 D, 179/1 HF, 170.2, 170.4, 170 R

[56] References Cited

U.S. PATENT DOCUMENTS

| | | | |
|---|---|---|---|
| 3,462,560 | 8/1969 | Holzman | 179/81 A |
| 3,748,400 | 7/1973 | Ritz | 179/81 A |

*Primary Examiner*—Kathleen H. Claffy
*Assistant Examiner*—Joseph A. Popek

[57] ABSTRACT

The invention relates to an electronic circuit for a speakerphone which, when in the balanced condition, will eliminate acoustic feedback as between the microphone and the speaker of the speakerphone. The arrangement consists of a bridge having four legs. Input from telephone lines are fed into the bridge between two adjacent points (i.e. across one leg) of the bridge. The microphone is connected between one of the input points and a point opposite to the one input point. The legs on either side of the opposite point of the microphone connection contain equal impedances, and the fourth leg, between the input leg and one of the equal impedance legs, contains a variable impedance. To balance the bridge, the variable impedance is adjusted such that the microphone signal, appearing in opposite sides of the bridge, will be canceled out and thereby prevented from exiting on the speaker circuits. However, because of the imbalance relative thereto, the microphone signal will be passed up the telephone lines. Again, because of a similar imbalance, input from the telephone lines will be fed out to the speaker circuits.

6 Claims, 2 Drawing Figures

ELECTRONIC CIRCUIT FOR A SPEAKERPHONE

BACKGROUND OF THE INVENTION

1. Field of the Invention

This invention relates to an electronic circuit for a speakerphone. More specifically, the invention relates to such a circuit which permits full duplexing in one unit with microphone and speaker being disposed in fixed positions relative to one another and in close proximity to one another.

2. Description of the Prior Art

In available speakerphones with full duplexing, the receivers have to be arranged so that they are movable relative to the transmitter. This is necessary to overcome effects of acoustic coupling which causes large amounts of squeal arising out of acoustic feedback from the microphone to the speaker circuits. In such units, acoustic coupling can be eliminated by physically adjusting the positions of the speaker and the microphone relative to each other.

However, it is inconvenient to have to move the elements relative to one another, and it is also inconvenient to have to have two separate elements located on, for example, a desk, as this takes up an inordinate amount of space. In addition, it is uncomfortable to be subjected to the squealing noise before a physical adjustment is made.

SUMMARY OF THE INVENTION

It is therefore an object of the invention to provide a circuit for a speakerphone which eliminates acoustic coupling electronically.

It is a further object of the invention to provide such a circuit which is in the form of an electronic bridge.

It is a still further object of the invention to provide such a bridge which balances microphone signals with respect to the speaker input terminals whereby the microphone signals at the speaker terminals are canceled by each other.

In accordance with the invention, an electronic circuit for a speakerphone having input terminals for connection to telephone lines having a line impedance thereacross, and output terminals for connection to speaker circuits, comprises: a bridge arrangement having four legs; the first leg being connected to the second leg at a first point; the second leg being connected to the third leg at a second point; the third leg being connected to the fourth leg at a third point; the fourth leg being connected to the first leg at a fourth point; the third and fourth points constituting the input terminals; the second and fourth points constituting the output terminals; the first and second legs having equal impedances; said line impedance constituting the impedance of said fourth leg; and a variable impedance in said third leg for balancing said bridge.

In a specific embodiment of the electronic circuit arrangement, wherein one of the input terminals is connected to a line of common potential, the circuit comprises: a first series circuit including said first input terminal, a first variable impedance, the primary winding of a transformer, and a second variable impedance, and terminating at said line of common potential; a microphone having an output connected to the input of a microphone amplifier; said microphone amplifier having one terminal connected to said line of common potential, and having an output terminal connected to a point in said primary of said transformer; a second series circuit including a low pass filter, having an input terminal, an output terminal and a ground terminal, a speaker amplifier having an input terminal, an output terminal and a ground terminal, and a speaker having an input terminal and a ground terminal; said ground terminals of said low pass filter, said speaker amplifier and said speaker being connected to said line of common potential; said input terminal of said low pass filter being connected to a point in the secondary winding of said transformer; said output terminal of said low pass filter being connected to said input terminal of said speaker amplifier, and said output terminal of said speaker amplifier being connected to said input terminal of said speaker; whereby, when said first series circuit is in a balanced condition, said circit arrangement is in a balanced condition and the output of said microphone amplifier will not appear at the secondary winding of said transformer, but an input signal present at the input terminals of said circuit arrangement will be impressed on said secondary winding from said primary winding.

Two resistors may be connected between the ends of the secondary winding whereupon the input terminal of the low pass filter is connected at the junction of said two resistors.

The circuit arrangement preferably further comprises a pilot oscillator having an output terminal and a ground terminal; the ground terminal of said pilot oscillator being connected to said line of common potential; said output terminal of said pilot oscillator being connected to said input terminal of said microphone amplifier; said arrangement still further comprising a third series circuit including a pilot filter, having an input terminal, an output terminal and a ground terminal, and a pilot detector, having an input terminal, an output terminal, and a ground terminal; said ground terminals of said pilot filter and said pilot detector being connected to said line of common potential; said input terminal of said pilot filter being connected to said junction of said resistors; said output terminal of said pilot filter being connected to said input terminal of said pilot detector; whereby, a signal at the output of said pilot detector indicates an imbalance in the circuit arrangement.

In a preferred embodiment, the first variable impedance comprises a variable inductor and the second variable impedance comprises a variable resistor.

BRIEF DESCRIPTION OF THE DRAWINGS

The invention will be better understood by an examination of the following disclosure together with the accompanying drawings in which.

DETAILED DESCRIPTION OF THE DRAWINGS

Figure 1:
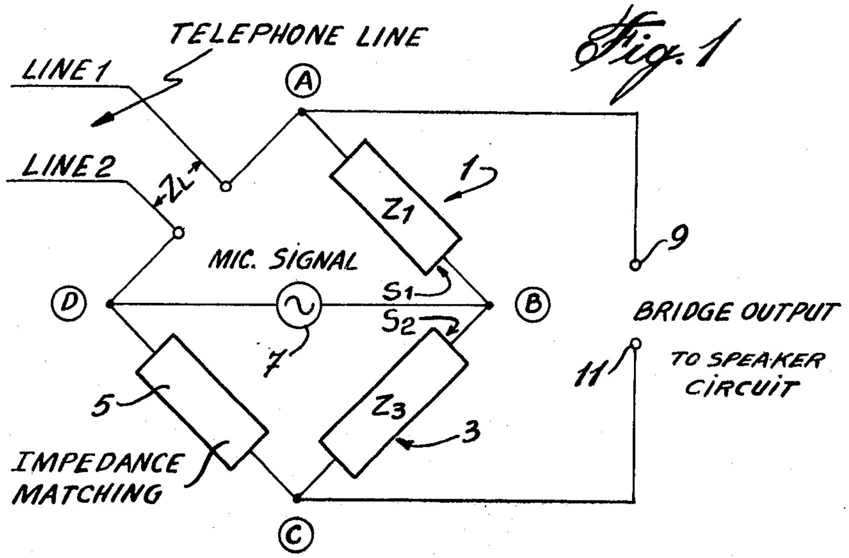
FIG. 1 illustrates, in block form, the basic principles of the invention.

Referring now to FIG. 1, in accordance with the basic principles of the invention, a bridge is provided including impedances 1 and 3 in adjacent arms of the bridge. The impedances Z1 and Z3 are equal in value.

Input from telephone lines 1 and 2 are fed to the bridge between points A and D thereof. The impedance of the arm of the bridge between the points A and D is the line impedance of the telephone lines, that is, ZL. The fourth arm, between the points D and C, includes a matching impedance 5 which is variable and adjustable.

A microphone 7 is included between the points D and B, and the points A and C of the bridge are connected to the bridge output terminals 9 and 11 and, from there, to speaker circuits.

In considering the operation of the bridge, an output signal from the microphone will be split up into signals S1, to the top side of the bridge, and signal S2, to the bottom part of the bridge. When the bridge is in the balanced condition, then the magnitude at S1 at point A will be equal and opposite to the magnitude of S2 at point C so that these signals will cancel each other out at the terminals 9 and 11 and the microphone signals will not be fed to the speaker circuits. On the other hand, the magnitude of S1 at point A is quite different from the magnitude of S2 at point D so that the microphone signal will be fed up the telephone lines.

Considering an input from the telephone lines, the magnitude of such a telephone signal at point A of the bridge will be different from the magnitude of this telephone signal at point C of the bridge so that an output of such a signal received on the telephone lines will be fed to the speaker circuit.

Accordingly, there is no acoustic coupling as between the microphone and the speaker circuits.

Figure 2:
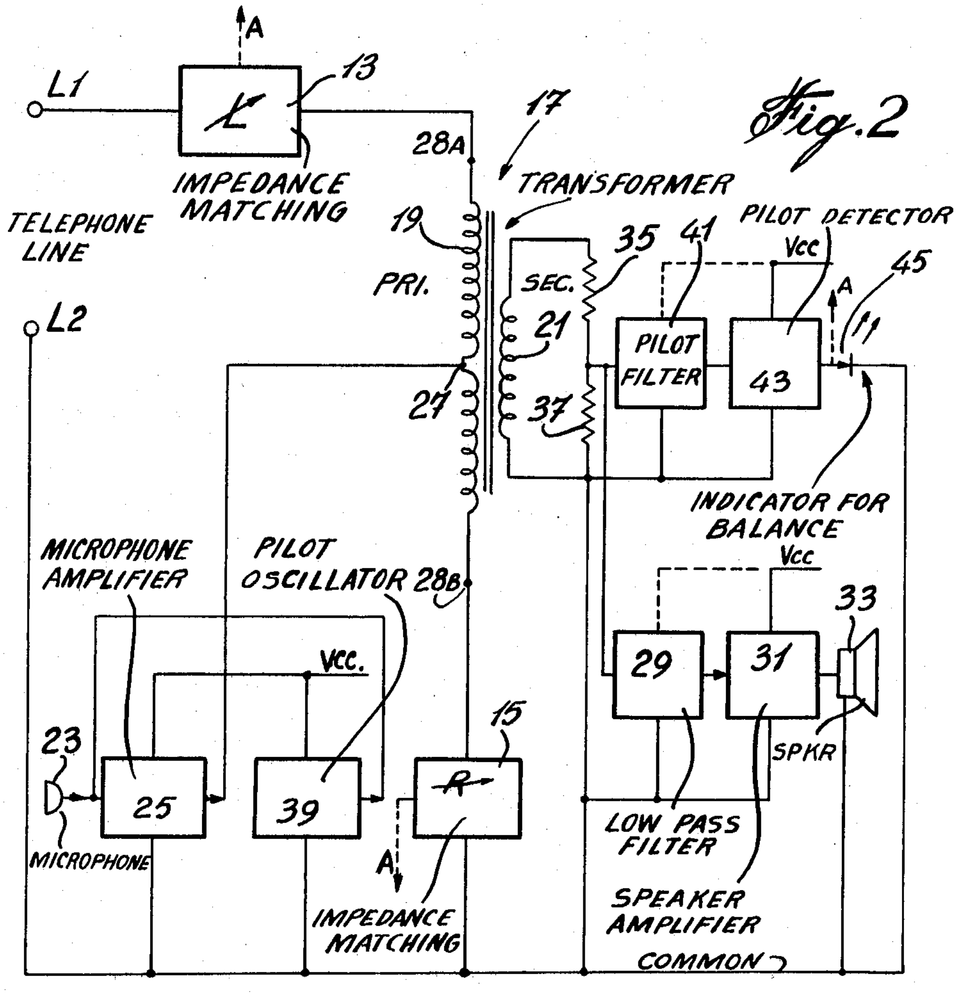
FIG. 2 is a specific circuit arrangement embodying the invention.

Referring now to FIG. 2, the illustrated circuit has input terminals L1 and L2 connected, respectively, to lines 1 and 2 of a telephone system. A first series circuit, including a variable impedance 13, a second variable impedance 15, and the primary winding 19 of a transformer 17, extends from L1 to a line of common potential. As can be seen, the terminal L2 is also connected to the line of common potential. The transformer 17 includes the secondary winding 21.

A second series circuit includes a microphone 23, whose output is fed to the input of a microphone amplifier 25. The output of the amplifier 25 is fed to a point 27 in the primary winding 19 of the transformer 17. On the other side of the transformer, the arrangement includes a second series circuit consisting of low pass filter 29, whose output is fed to the input of a speaker amplifier 31. The output of the speaker amplifier is fed to the input of a speaker 33. The input of the low pass filter is fed to the junction of resistors 35 and 37 which are connected between the ends of the secondary winding 21. The resistors 35 and 37 form a voltage divider to tap required voltage as well known in the art.

The arrangement also includes a pilot oscillator 39 whose output is fed to the input of the microphone amplifier 25. Associated with the pilot oscillator, on the other side of the transformer, is a pilot filter 41 whose input is connected to the junction of resistors 35 and 37. The output of the pilot filter is fed to the input of the pilot detector 43, and the output of the pilot detector may be fed to an indicator 45, or may be used for adjusting the variable impedances as will be discussed below.

As per normal practices, the elements 25, 39, 41, 43, 29, 31 and 33 will be connected to ground. In addition, a source of potential Vcc is provided for powering the elements 25, 39, 43 and 31. The filters 29 and 41 may be passive filters in which case it will not be necessary to power them. However, the filters may also be active filters in which case it will be necessary to connect them to Vcc as shown in dotted lines in FIG. 2.

In a preferred embodiment, the variable impedance 13 comprises a variable inductor which has the function of cancelling the line capacitance. Although a continuously invariable inductor could be used, it is preferred to use an inductor which is adjusted to discrete values.

The variable impedance 15 is preferably a variable resistor.

Comparing the circuit of FIG. 2 with the block diagram in FIG. 1, the top half of the transformer 17 from point 27 to point 28A plus the impedance 13 is equivalent to the impedance 1. The bottom half of the transformer, from 27 to 28B, is equivalent to the impedance 3. Finally, impedance 15 of FIG. 2 is equivalent to the impedance 5 of FIG. 1.

In operation, the arrangement works as follows:

With the arrangement balanced, by adjustment of 13 and 15, a signal fed to the point 27 from the microphone amplifier will be canceled out in the primary so that it will not be fed to the secondary. Accordingly, the microphone signal is not fed to the speaker circuits.

On the other hand, a input between L1 and L2 will have different values at the ends of primary 19 so that it will be impressed on the secondary 21. From the secondary 21, the output is fed to the low pass filter 29 and, from there, to the speaker amplifier and to the speaker.

The low pass filter passes frequencies in the audio range and will eliminate spurious noise and undesirable frequencies.

The pilot oscillator, pilot filter and pilot detector are included for the purpose of determining when the arrangement is balanced. The pilot oscillator generates a super-audio frequency and the output of the oscillator is fed to the microphone amplifier and, thence, to the point 27 of the primary 19 of the transformer 17. When the circuit arrangement is balanced, the pilot oscillator signal will be canceled out in the transformer so that no output from the oscillator will be impressed on the secondary 21. However, when the arrangement is not balanced, then an output from the oscillator will be impressed on the secondary 21, and this output will be fed to the pilot filter, the pilot detector, and an indicator 45. The pilot filter is sharply tuned to the frequency of the pilot oscillator. Means for detecting, as included in the detector 43, are well known in the art and require no detailed description. However, as an example of what could be used here, the detector 43 could include a diode to change the bi-directional signal at the output of the filter to a unidirectional signal. It could also include a capacitor for smoothing the unidirectional signal to thereby provide a DC like signal at the output of the detector.

The indicator 45 could be a visual type indicator, i.e., an LED or a simple light bulb, which would be included on the top surface of the speakerphone. When this light bulb is on, the user would be cautioned that the arrangement is not balanced and would take steps to balance the arrangement.

Alternatively, if it is desired to have an automatic balancing arrangement, then the output from 43 could be fed to control terminals of 13 and 15 with the dotted lines and arrows in FIG. 2. The voltage at the output of the detector would be of such a magnitude and direction as to adjust the impedance 13 and 15 so as to eliminate the output of the detector 43.

Although a specific embodiment has been above described, this was for the purpose of illustrating, but not limiting, the invention. Various modifications which will come readily to the mind of one skilled in the art are within the scope of the invention as defined in the appended claims.

We claim:

1. An electronic circuit arrangement for a speakerphone having a first input terminal and a second input terminal, said second input terminal being connected to a line of common potential, and comprising:

a first series circuit including said first input terminal, a first variable impedance, the primary winding of a transformer, and a second variable impedance, and terminating at said line of common potential;

a microphone having an output connected to the input of a microphone amplifier;

said microphone amplifier having one terminal connected to said line of common potential, and having an output terminal connected to a point in said primary of said transformer;

a second series circuit including a filter, having an input terminal, an output terminal and a ground terminal, a speaker amplifier having an input terminal, an output terminal and a ground terminal, and a speaker having an input terminal and a ground terminal;

said ground terminals of said filter, said speaker amplifier and said speaker being connected to said line of common potential;

circuit means connected across the secondary winding of said transformer, said input terminal of said filter being connected to said circuit means;

said output terminal of said filter being connected to said input terminal of said speaker amplifier, and said output terminal of said speaker amplifier being connected to said input terminal of said speaker;

whereby, when said first series circuit is in a balanced condition, said circuit arrangement is in a balanced condition and the output of said microphone amplifier will not appear at the secondary winding of said transformer, but an input signal present of the input terminals of said circuit arrangement will be impressed on said secondary winding from said primary winding.

2. An arrangement as defined in claim 1 wherein said circuit means connected across the secondary winding comprises two resistors connected between the ends of said secondary winding;

the input terminal of said filter being connected at the junction of said two resistors.

3. An arrangement as defined in claim 2 and further comprising a pilot oscillator having an output terminal and a ground terminal;

the ground terminal of said pilot oscillator being connected to said line of common potential;

said output terminal of said pilot oscillator being connected to said input terminal of said microphone amplifier;

said arrangement still further comprising a third series circuit including a pilot filter, having an input terminal, a output terminal and a ground terminal, and a pilot detector, having an input terminal, an output terminal, and a ground terminal;

said ground terminals of said pilot filter and said pilot detector being connected to said line of common potential;

said input terminal of said pilot filter being connected to said junction of said resistors;

said output terminal of said pilot filter being connected to said input terminal of said pilot detector;

whereby, a signal at the output of said pilot detector indicates an imbalance in the circuit arrangement.

4. An arrangement as defined in claim 3 wherein said first variable impedance comprises a variable inductor, and wherein said second variable impedance comprises a variable resistor.

5. An arrangement as defined in claim 4 and further comprising indicator means connected to the output terminal of said pilot detector.

6. An arrangement as defined in claim 4 and further comprising a power supply connected to power terminals of each said microphone amplifier, pilot oscillator, pilot detector, and speaker amplifier, respectively.

* * * * *